US012806902B2

(12) United States Patent
Tokimatsu

(10) Patent No.: US 12,806,902 B2
(45) Date of Patent: Nov. 24, 2026

(54) INKJET RECORDING APPARATUS AND INK HEATING UNIT

(71) Applicant: Konica Minolta, Inc., Tokyo (JP)

(72) Inventor: Hiroyuki Tokimatsu, Higashimurayama (JP)

(73) Assignee: KONICA MINOLTA, INC., Tokyo (JP)

( * ) Notice: Subject to any disclaimer, the term of this patent is extended or adjusted under 35 U.S.C. 154(b) by 119 days.

(21) Appl. No.: 18/911,652

(22) Filed: Oct. 10, 2024

(65) Prior Publication Data

US 2025/0128512 A1 Apr. 24, 2025

(30) Foreign Application Priority Data

Oct. 18, 2023 (JP) ................................ 2023-179256

(51) Int. Cl.

*B41J 2/17* (2006.01)
*B41J 2/14* (2006.01)
*B41J 2/175* (2006.01)
*B41J 2/19* (2006.01)

(52) U.S. Cl.

CPC ......... *B41J 2/14088* (2013.01); *B41J 2/1408* (2013.01); *B41J 2/1707* (2013.01); *B41J 2/17596* (2013.01); *B41J 2/19* (2013.01)

(58) Field of Classification Search

CPC ........................................................ B41J 2/19
See application file for complete search history.

(56) References Cited

U.S. PATENT DOCUMENTS

2020/0031114 A1* 1/2020 Ishihara ............... B41J 2/04563
2023/0035870 A1* 2/2023 Takehana ................ B41J 2/165

FOREIGN PATENT DOCUMENTS

JP 2020199720 A * 12/2020
JP 2021-133629 A 9/2021

OTHER PUBLICATIONS

Kanai, MachineTranslationofJP-2020199720-A, 2020 (Year: 2020).*

* cited by examiner

*Primary Examiner* — Scott A Richmond
(74) *Attorney, Agent, or Firm* — LUCAS & MERCANTI, LLP

(57) ABSTRACT

An inkjet recording apparatus forms an image by ejecting an ink to a recording medium from an inkjet head, and includes an ink heating device that heats the ink and a carriage where a plurality of inkjet heads each being the inkjet head is mounted. The ink heating device is fixed to an outer surface of the carriage. The ink heated by the ink heating device is supplied to the inkjet heads.

12 Claims, 4 Drawing Sheets

INKJET RECORDING APPARATUS AND INK HEATING UNIT

CROSS-REFERENCE TO RELATED APPLICATIONS

The entire disclosure of Japanese Patent Application No. 2023-179256 filed on Oct. 18, 2023 is incorporated herein by reference in its entirety.

BACKGROUND OF THE INVENTION

Technical Field

The present invention relates to an inkjet recording apparatus and an ink heating unit.

Description of Related Art

There has been known an inkjet recording apparatus that records an image on a recording medium by ejecting ink from an inkjet head(s). Since physical properties of ink, such as viscosity and surface tension, change according to the temperature, the size of droplets also changes. When there is variation in the size of the droplets, the quality of the image decreases, and therefore it is necessary to appropriately control the temperature of the ink in the inkjet recording apparatus.

For example, Japanese Unexamined Patent Publication No. 2021-133629 describes an ink supply apparatus in which a heating device for heating ink is provided in an ink channel between a main tank and a sub-tank for storing ink supplied from the main tank.

SUMMARY OF THE INVENTION

However, in the invention of Japanese Unexamined Patent Publication No. 2021-133629, the longer the distance from the ink channel to the sub-tank is, the more the temperature of the ink heated by the ink heating device decreases, which is not preferable in terms of energy efficiency.

The present invention has been made in view of such circumstances. Its objects include providing an inkjet recording apparatus and an ink heating unit that can control the temperature of ink with excellent energy efficiency.

To achieve at least one of the abovementioned objects, according to an aspect of the present invention, an inkjet recording apparatus reflecting one aspect of the present invention forms an image by ejecting an ink to a recording medium from an inkjet head, and includes:

an ink heating device that heats the ink; and a carriage where a plurality of inkjet heads each being the inkjet head is mounted, wherein the ink heating device is fixed to an outer surface of the carriage, and wherein the ink heated by the ink heating device is supplied to the inkjet heads.

According to an aspect of the present invention, an ink heating unit reflecting one aspect of the present invention includes:

an ink heating device that heats an ink; and a carriage having an outer surface to which the ink heating device is fixed.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Figure 1:
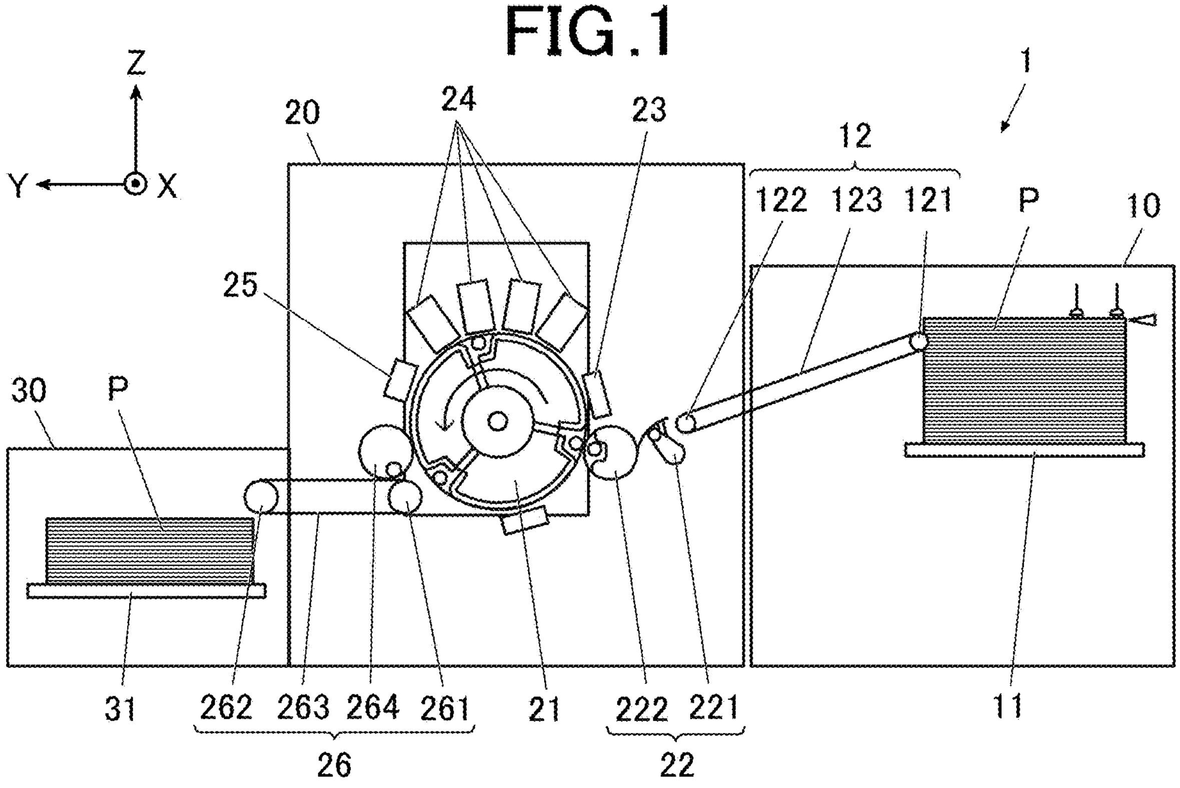
FIG. 1 is a side view of an inkjet recording apparatus as viewed from its width direction.

Hereinafter, an inkjet recording apparatus according to one or more embodiments of the present invention will be described in detail with reference to the drawings. However, the scope of the invention is not limited to the embodiments described below or illustrated examples. In the following description, components having the same functions and configurations are denoted by the same reference numerals, and the description thereof will be omitted.

First Embodiment

[Overall Configuration of Inkjet Recording Apparatus]

Figure 2:
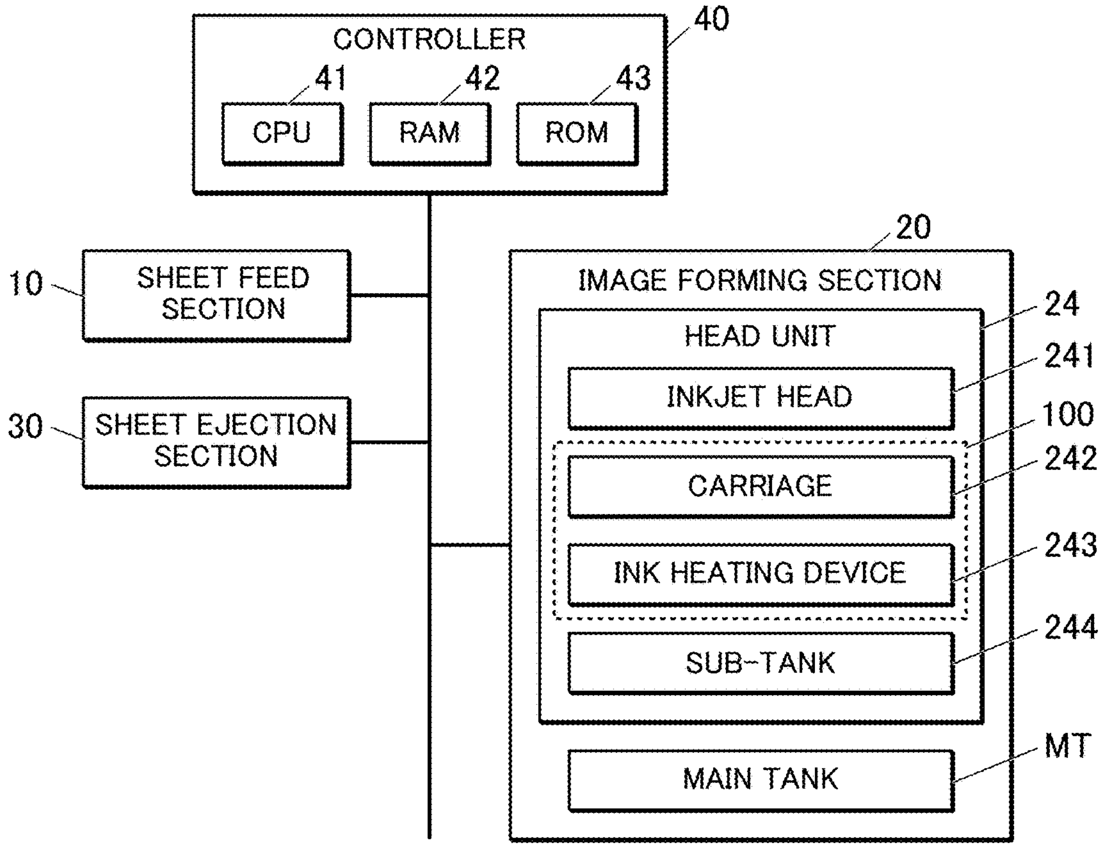
FIG. 2 is a block diagram of the inkjet recording apparatus.

FIG. 1 is a side sectional view showing main components of an inkjet recording apparatus 1. FIG. 2 is a block diagram illustrating a functional configuration of the inkjet recording apparatus 1. The inkjet recording apparatus 1 according to a first embodiment includes a sheet feed section 10, an image forming section 20, a sheet ejection section 30, and a controller 40.

Note that hereinafter, an X direction, a Y direction, and a Z direction refer to the directions illustrated in FIG. 1. Furthermore, hereinafter, the X direction, the Y direction, and the Z direction are referred to as a width direction, a conveyance direction, and a height direction, respectively.

(Sheet Feed Section)

The sheet feed section 10 stores recording media P before image formation. The sheet feed section 10 conveys the recording media P to the image forming section 20 under the control of the controller 40. The sheet feed section 10 includes a sheet feed tray 11 and a conveyance section 12.

{Sheet Feed Tray}

The sheet feed tray 11 is a plate member that stores the recording media P. The sheet feed tray 11 is provided such that one or more recording media P can be placed thereon. The sheet feed tray 11 moves upward and downward according to the amount of the recording media P placed thereon. By the upward and downward movements, the sheet feed tray 11 is kept at a position where the uppermost recording medium P is conveyed by the conveyance section 12.

{Conveyance Section}

The conveyance section 12 conveys the recording media P from the sheet feed tray 11 to the image forming section 20. The conveyance section 12 includes a conveyance mechanism. The conveyance mechanism drives a belt 123 to convey the recording media P on the belt 123. The belt 123 has a ring shape, and the inner side of the ring is supported by rollers 121 and 122.

The conveyance section 12 includes a supply section. The supply section hands the uppermost recording medium P placed on the sheet supply tray 11 onto the belt 123. The conveyance section 12 conveys the recording medium P along the belt 123 with the supply section.

(Image Forming Section)

The image forming section 20 performs a recording operation on the recording medium P under the control of the controller 40. The image forming section 20 includes an image forming drum 21, a handover unit 22, a sheet heating section 23, head units 24, an emission section 25, and a delivery section 26.

{Image Forming Drum}

The image forming drum 21 holds the recording medium P along its cylindrical outer peripheral surface and rotates to carry the recording medium P. The conveyance surface of the image forming drum 21 faces the sheet heating section 23, the head units 24, and the emission section 25 to perform an image forming process on the recording medium P being conveyed.

{Handover Unit}

The handover unit 22 is interposed between the conveyance section 12 and the image forming drum 21. The handover unit 22 includes a claw 221 and a handover drum 222.

The claw 221 is a cylindrical part that holds one end of the recording medium P conveyed by the conveyance section 12. The handover drum 222 guides the recording medium P held by the claw 221.

The handover unit 22 picks up the recording medium P on the conveyance section 12 with the claw 221 and places the recording medium P along the outer peripheral surface of the handover drum 222. Thus, the handover unit 22 hands the recording medium P to the image forming drum 21.

{Sheet Heating Section}

The sheet heating section 23 includes, for example, a heating wire and generates heat in response to energization. The sheet heating section 23 is controlled by the controller 40 to generate heat so that the recording medium P passing through the vicinity thereof reaches a predetermined temperature. The sheet heating section 23 is provided in the vicinity of the outer peripheral surface of the image forming drum 21 and on the upstream side of the head units 24 in the conveyance direction of the recording medium P.

A temperature sensor (not illustrated) is provided near the sheet heating section 23. The controller 40 detects the temperature in the vicinity of the sheet heating section 23 with the temperature sensor. The controller 40 controls heat generation of the sheet heating section 23 on the basis of the detected temperature.

{Head Units}

The head units 24 form an image by ejecting ink onto the recording medium P. The head units 24 corresponding to the colors of C (cyan), M (magenta), Y (yellow), and K (black) are provided. In FIG. 1, the head units 24 corresponding to the colors of Y, M, C, and K are provided in this order from the upstream side in the conveyance direction of the recording medium P.

Each head unit 24 of the present embodiment is configured such that a plurality of inkjet heads 241 (refer to FIG. 3) which are droplet ejection heads are arranged on a carriage 242 (refer to FIG. 3) for the recording medium P.

Each head unit 24 forms an image by ejecting ink onto the recording medium P being conveyed, from the carriage 242 whose length in the width direction is longer than that of the recording medium P. That is, the inkjet recording apparatus 1 is a line head type inkjet recording apparatus.

The number of head units 24 provided in the image forming section 20 may be three or less or five or more. The inkjet recording apparatus 1 may be a serial head type that forms an image by causing the carriage 242 whose length in the width direction is shorter than that of the recording medium P to perform scanning in the width direction.

Furthermore, the ink ejected by the head units 24 is, for example, ultraviolet curable ink. The ultraviolet curable ink is a gel-like ink that undergoes a phase-change between a gel state and a liquid (sol) state according to the temperature in a state in which ultraviolet rays are not emitted from the emission section 25. The sol-gel phase transition temperature of the UV curable ink is preferably in a range of 40 to 70 °C and more preferably in a range of 50 to 65 °C. A more detailed configuration of the head units 24 will be described later.

{Emission Section}

The emission section 25 includes, for example, a fluorescent tube such as a low-pressure mercury lamp. The emission section 25 emits energy rays such as ultraviolet rays by light emission of the fluorescent tube. The emission section 25 is provided in the vicinity of the outer peripheral surface of the image forming drum 21. The emission section 25 is provided so as to be located on the downstream side of the head units 24 in the conveyance direction of the recording medium P. The emission section 25 emits energy rays to the recording medium P on which ink has been ejected. The ink on the recording medium P is cured by the effect of the energy rays.

The fluorescent tube that emits ultraviolet rays is not limited to the low-pressure mercury lamp. The fluorescent tube may be a mercury lamp with an operating pressure of about a few hundred Pa to 1 MPa, for example. The fluorescent tube may be a light source usable as a bactericidal lamp, for example, a cold-cathode tube, an ultraviolet laser light source, a metal halide lamp, a light emitting diode, or the like. The fluorescent tube is desirably a power saving light source capable of emitting ultraviolet light with higher illuminance. The fluorescent tube is, for example, a light emitting diode or the like. The energy rays are not limited to the ultraviolet rays, and may be energy rays having a property of curing the ink in accordance with the property of the ink. The light source is also replaced in accordance with the energy rays.

Although the head units 24 eject the ultraviolet curable ink in the above, they are not limited thereto. The ink ejected by the head units 24 may be water-based ink or other ink.

{Delivery Section}

The delivery section 26 includes a conveyance mechanism. The conveyance mechanism drives a ring-shaped belt 263 to convey the recording medium P. The inner side of the belt 263 is supported by rollers 261 and 262. The delivery section 26 includes a cylindrical handover roller 264. The handover roller 264 hands the recording medium P from the image forming drum 21 to the conveyance mechanism. The delivery section 26 conveys the recording medium P handed by the handover roller 264 onto the belt 263 to send it out to the sheet ejection section 30.

(Sheet Ejection Section)

The recording medium P on which an image has been formed by the image forming section 20 is ejected to the sheet ejection section 30.

The sheet ejection section 30 includes a sheet ejection tray 31 having a plate shape. The recording medium P sent out from the image forming section 20 by the delivery section 26 is placed on the sheet ejection tray 31. The sheet ejection section 30 stores the recording medium P until a user takes out the recording medium P.

(Head Units)

Figure 3:
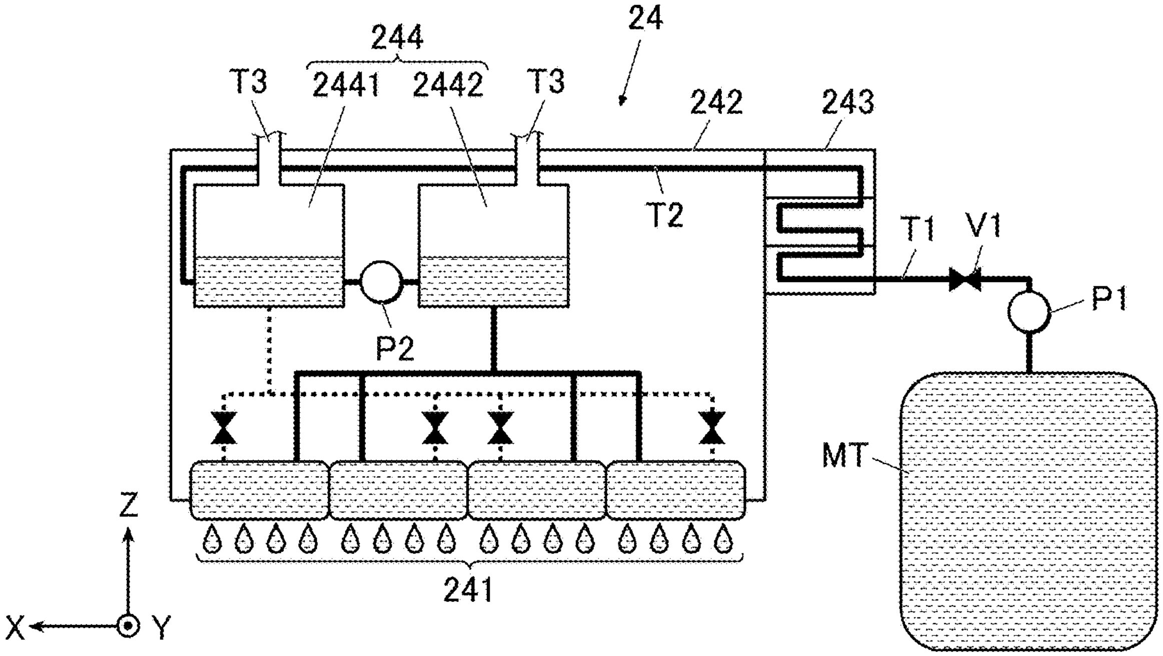
FIG. 3 is a schematic configuration diagram of a liquid sending portion of the inkjet recording apparatus according to a first embodiment.

FIG. 3 is a schematic configuration diagram of each head unit 24 according to the first embodiment. The head unit 24 includes not only the plurality of inkjet heads 241 and the carriage 242 but also an ink heating device 243 and a sub-tank 244. As shown in FIG. 3, the components of the head unit 24 except the carriage 242 are fixedly mounted on/in the carriage 242. The head unit 24 is connected to a main tank MT which accommodates ink of each color and is disposed outside the carriage 242. As shown in FIG. 2, the carriage 242 and the ink heating device 243 constitute an ink heating unit 100.

{Main Tank}

The main tank MT is, for example, a rigid tank made of resin. The capacity of the main tank MT is, for example, about 30 L, but is not limited thereto. As shown in FIG. 3, the main tank MT is connected to a first end of a first pipe T1, and communicates with the ink heating device 243 via the first pipe T1.

{First Pipe}

The first pipe T1 is a member that connects the main tank MT and the ink heating device 243. The first pipe T1 is, for example, a tube having a predetermined degree of elasticity. When the first pipe T1 is a tube, it is easily attached to and detached from the main tank MT and the ink heating device 243. Furthermore, in a case where the inkjet recording apparatus 1 is, for example, a serial head type, when the first pipe T1 is elastic, the head unit 24 can freely perform scanning in the width direction.

In the first pipe T1, a supply pump P1 is provided in the vicinity of the main tank MT. The supply pump P1 operates under the control of the controller 40 and supplies the ink in the main tank MT to a first sub-tank 2441. When the amount of the ink inside the main tank MT becomes small, ink is replenished and used.

In the first pipe T1, a supply control valve V1 is provided on the downstream side of the supply pump P1 in the liquid sending direction. The supply control valve V1 is an electromagnetic valve. The opening and closing of the supply control valve V1 is controlled by the controller 40. To be specific, the supply control valve V1 is opened when the supply pump P1 supplies the ink in the main tank MT to the first sub-tank 2441 described later, and is closed at the other time.

{Ink Heating Device}

The ink heating device 243 is formed of, for example, aluminum, is connected to a second end of the first pipe T1, and heats the ink supplied from the main tank MT (first pipe T1) under the control of the controller 40. As shown in FIG. 3, the ink heating device 243 is fastened at and fixed to a first end (end) of the outer surface of the carriage 242 by, for example, a screw.

Figure 4:
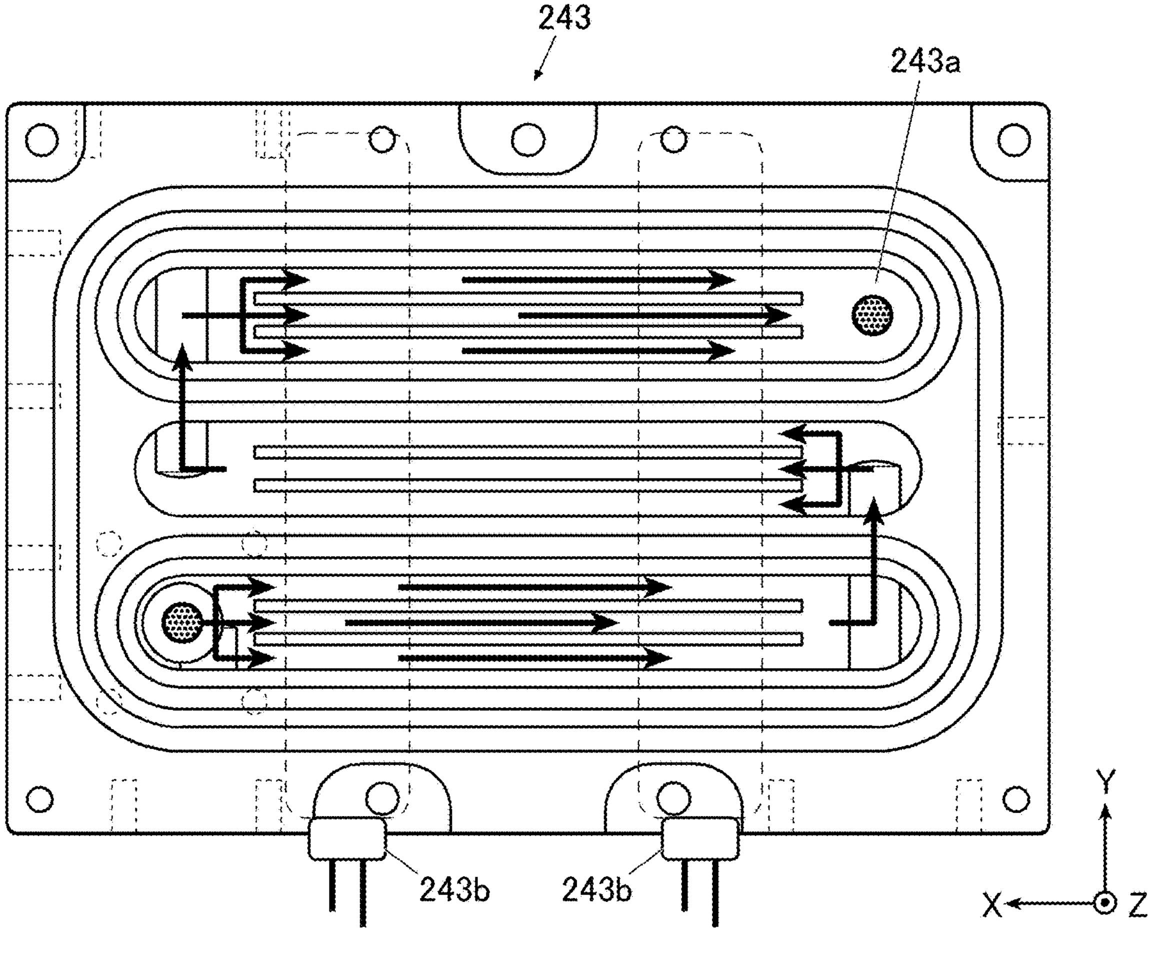
FIG. 4 is a top sectional view of an ink heating device.

An example of a top sectional view of the ink heating device 243 is shown in FIG. 4. As shown in FIG. 4, the ink heating device 243 includes a meandering channel 243*a*. Furthermore, the ink heating device 243 includes a cartridge heater 243*b* that traverses the channel 243*a* in the conveyance direction, and heats the ink in the channel 243*a*.

As indicated by arrows in FIG. 4, the channel 243*a* is provided so as to branch into a plurality of channels (three channels in FIG. 4) and join together. By such a configuration of the channel 243*a*, the area where the ink is in contact with the heated channel 243*a* is increased. The ink heating device 243 has a configuration in which such a channel 243*a* becomes a plurality of stages (three stages in FIG. 3) stacked in the vertical direction, and a time period in which the ink stays in the ink heating device 243 becomes longer. With these configurations, the ink heating device 243 can sufficiently heat the ink therein.

In FIG. 4, the configuration in which the channel 243*a* branches off into three channels is exemplified, but the present invention is not limited thereto, and the number of branches in the channel 243*a* may be increased to increase the contact area with the ink. However, as the number of branches increases, channel resistance increases and pressure that is required for the supply pump P1 increases. Therefore, it is preferable to appropriately set the number of branches according to a preferable balance between the heating efficiency and the channel resistance. Furthermore, the ink volume of the ink heating device 243 is, for example, about 300 cc.

In addition, as described above, the ink which is ejected by the head unit 24 is gel-like ink which changes in phase according to the temperature. When the phase transition temperature of the ink is equal to or lower than 70 °C, the temperature of the ink ejected from the inkjet heads 241 is preferably near 80 °C. Therefore, in order to quickly heat the ink such that the temperature of the ink becomes near 80 °C, the controller 40 preferably controls the ink heating device 243 such that the temperature thereof becomes about 5 to 15 °C higher than the above, that is, becomes about 90 °C. In this way, the controller 40 functions as a first controller that controls the ink heating device 243 such that the temperature thereof is higher than that of the ink ejected from the inkjet heads 241.

{Second Pipe}

Units mounted on the carriage 242 on the downstream side of the ink heating device 243 in the liquid sending direction communicate with each other through a second pipe T2. That is, the second pipe T2 is an ink channel in the carriage 242.

The second pipe T2 is a rigid channel and is made of, for example, metal. Unlike the first pipe T1, the second pipe T2 is provided with a heating member for heating the ink inside to an appropriate temperature, for example, on the outer peripheral surface thereof. The heating member is, for example, a rubber heater in which a belt-shaped heat generating body is arranged in a corrugated manner on a thin plate-like insulating heat-insulating body, but is not limited thereto. When the heating member is a rubber heater, it directly contacts and heats the outer surface of the second pipe T2.

The controller 40 serving as a temperature controller controls, of the second pipe T2, the heating member of a pipe by which the ink heating device 243 and the first sub-tank 2441 communicate with each other such that the temperature of the ink inside the pipe becomes, for example, 90 °C. In addition, the controller 40 as the temperature controller controls, of the second pipe T2, the heating member of a pipe by which the first sub-tank 2441 and a second sub-tank 2442 communicate with each other such that the temperature of the ink in the pipe becomes, for example, 80 °C. With this configuration, ink at an appropriate temperature is supplied to each part.

{Sub-Tank}

The sub-tank 244 temporarily stores the ink sent from the main tank MT. The sub-tank 244 includes the first sub-tank 2441 and the second sub-tank 2442.

<First Sub-Tank>

The first sub-tank 2441 is one or a plurality of ink chambers. The volume of the first sub-tank 2441 is smaller than that of the main tank MT. The first sub-tank 2441 stores the ink that has been supplied from the main tank MT and passed through the ink heating device 243. By providing the first sub-tank 2441, fluctuation in pressure due to pulsation when the supply pump P1 supplies the ink in the main tank MT is alleviated.

A liquid sending pump P2 is provided in the pipe by which the first sub-tank 2441 and the second sub-tank 2442 communicate with each other. The liquid sending pump P2 is, for example, a diaphragm pump including a check valve and a diaphragm. When the liquid sending pump P2 is a diaphragm pump, a risk that a foreign substance is mixed in the ink and a risk that liquid leakage occurs are reduced.

The first sub-tank 2441 communicates with an outlet of each inkjet head 241 via a pipe. With the above-described configuration, of the ink supplied from the second sub-tank 2442 to the inkjet heads 241, the ink that has not been ejected from nozzles can be returned to the first sub-tank 2441. Components in the ink can be equalized by the ink being able to circulate from/to the first sub-tank 2441, the second sub-tank 2442 to/from the inkjet heads 241.

<Second Sub-Tank>

The second sub-tank 2442 is a tank chamber that temporarily stores the ink supplied from the first sub-tank 2441. The capacity of the second sub-tank 2442 is not particularly limited, but is, for example, substantially the same as the capacity of the first sub-tank 2441.

The second sub-tank 2442 communicates with an inlet of each inkjet head 241 via a pipe. Each inkjet head 241 is supplied with ink from the second sub-tank 2442 in accordance with the amount of ink to be ejected.

As illustrated in FIG. 3, the sub-tanks of the sub-tank 244 are provided with their respective air release channels T3 that communicate with the air. The air release channels T3 are provided with air pressure pumps and electromagnetic valves to individually pressurize or depressurize the inside of the sub-tanks of the sub-tank 244 under the control of the controller 40. In particular, by applying an appropriate negative pressure to the inside of the second sub-tank 2442, ink is prevented from leaking out from the inkjet heads 241 at normal times.

In addition, the sub-tanks of the sub-tank 244 are provided with heat retaining members that retain heat (keep warm) by heating the ink therein. The heat retaining members may be rubber heaters like the heating member, and are provided in such a manner as to contact, for example, the outer surfaces of the sub-tanks of the sub-tank 244. In the present invention, the temperature of the ink is adjusted in advance by the ink heating device 243 and the heating member. Therefore, the output of the heat retaining members may be the minimum.

Each of the first sub-tank 2441 and the second sub-tank 2442 is provided with a liquid amount detector (not shown). The liquid amount detector is, for example, a float sensor. When the liquid amount detector detects that the liquid amount falls below a predetermined value set in advance, the controller 40 sends the ink from a tank on the upstream side in the liquid sending direction.

(Controller)

Returning to FIG. 2, the controller 40 controls each part constituting the inkjet recording apparatus 1. As illustrated in FIG. 2, the controller 40 is connected to each part constituting the inkjet recording apparatus 1. The controller 40 includes a central processing unit (CPU) 41, a random access memory (RAM) 42, a read only memory (ROM) 43, and the like.

The CPU 41 reads various programs corresponding to processing contents and data from a storage device such as the ROM 43 and executes them. The CPU 41 controls the operation of each part of the inkjet recording apparatus 1 according to the executed processing contents. The RAM 42 temporarily stores therein various programs, data and so forth processed by the CPU 41. The ROM 43 stores various programs, data and so forth read by the CPU 41 or the like.

Effects of First Embodiment

As described above, in the inkjet recording apparatus 1 according to the first embodiment, the ink heating device 243 is fixed to the outer surface of the carriage 242. Then, the ink heated by the ink heating device 243 is supplied to the inkjet heads 241. According to the above-described configuration, since the distance from the ink heating device 243 to the inkjet heads 241 is short, the ink heated by the ink heating device 243 is less likely to be cooled. Therefore, it is less necessary to reheat the ink in the sub-tank 244 or the like, and energy efficiency is excellent. In addition, since the channel for the ink heated by the ink heating device 243 is less likely to be cooled, and energy efficiency is excellent. In addition, in the conventional invention, there has been a case where the heated ink is solidified by being cooled. In this case, there is a possibility that the ink is clogged in the ink channel and causes a liquid sending failure, but such a liquid sending failure can be prevented by the above-described configuration.

In addition, in the case of a configuration in which the ink is reheated in the sub-tank 244, the sub-tanks of the sub-tank 244 interfere with each other in terms of heat, which makes it difficult to appropriately control the temperature of the ink. However, according to the inkjet recording apparatus 1 according to the present embodiment, the amount of heating by the heat retaining members of the sub-tank 244 may be the minimum because heating by the ink heating device 243 is main. Therefore, the mutual interference of heat between the sub-tank of the sub-tank 244 as described above can be suppressed, and appropriate temperature control of the ink can be performed.

In the case where the ink ejected by the inkjet recording apparatus 1 is a sol-gel phase transition ink, if the temperature of the ink decreases before the ink is supplied to the sub-tank 244, the ink is phase-transited to the sol state, which may cause a problem in sending it by a pump. However, since the ink can be sent in the gel state in the present embodiment, the above-described problem is not posed.

Second Embodiment

The inkjet recording apparatus 1 according to a second embodiment will be described with reference to FIG. 5. Note that elements that are substantially the same as those described in the first embodiment are denoted by the same reference numerals, and detailed description of those elements is omitted.

Figure 5:
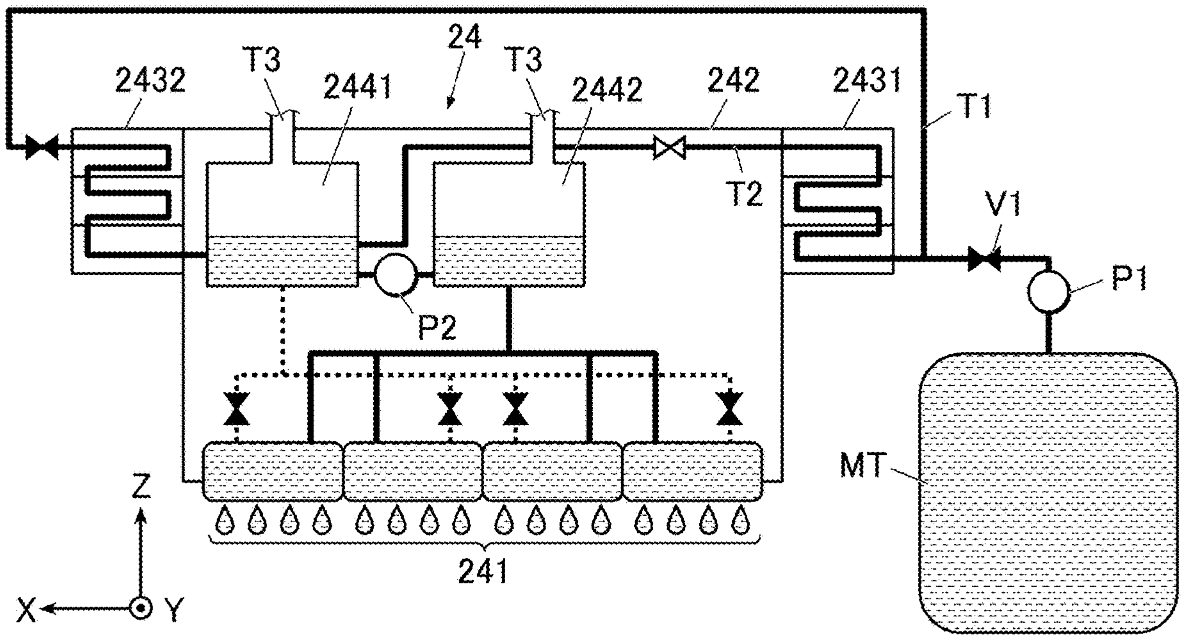
FIG. 5 is a schematic configuration diagram of the liquid sending portion of the inkjet recording apparatus according to a second embodiment.

The inkjet recording apparatus 1 of the second embodiment is different from the first embodiment in that, as illustrated in FIG. 5, the inkjet recording apparatus 1 includes a first ink heating device 2431 and a second ink heating device 2432 having the configuration same as or similar to the ink heating device 243. The second ink heating device 2432 is fixed to a second end that is the outer surface of the carriage 242 and opposite the first ink heating device 2431. In addition, the first pipe T1 branches off into two channels that communicate with the first ink heating device 2431 and the second ink heating device 2432, respectively.

Effects of Second Embodiment

When the ink heating device 243 heats the ink, the amount of heat thereof becomes extremely large. To be more specific, when the ink heating device 243 heats the ink of 300 cc to 90 °C, the amount of heat is about 7,000 J. Therefore, a temperature distribution occurs, in the carriage 242, between the vicinity of the ink heating device 243 and the other. Then, a temperature distribution of the ink to be ejected occurs between the inkjet head(s) 241 in the vicinity of the ink heating device 243 and the other inkjet head(s) 241. As a result, it is possible that variation occurs in the physical properties of the ink, variation also occurs in the size of the droplets, and the image quality decreases.

Therefore, the inkjet recording apparatus 1 according to the second and subsequent embodiments includes a temperature equalizing mechanism that equalizes the temperature of the carriage 242. The temperature equalizing mechanism in the second embodiment is the first ink heating device 2431 and the second ink heating device 2432. Specifically, since the ink heating device 243 has heat on the outer side surfaces on both sides of the carriage 242, the temperature of the carriage 242 becomes substantially uniform at both ends. Therefore, according to the configuration of the second embodiment, ink temperature control becomes easier, and it is possible to suppress decrease in image quality due to the temperature distribution in the carriage 242.

Third Embodiment

Figure 6:
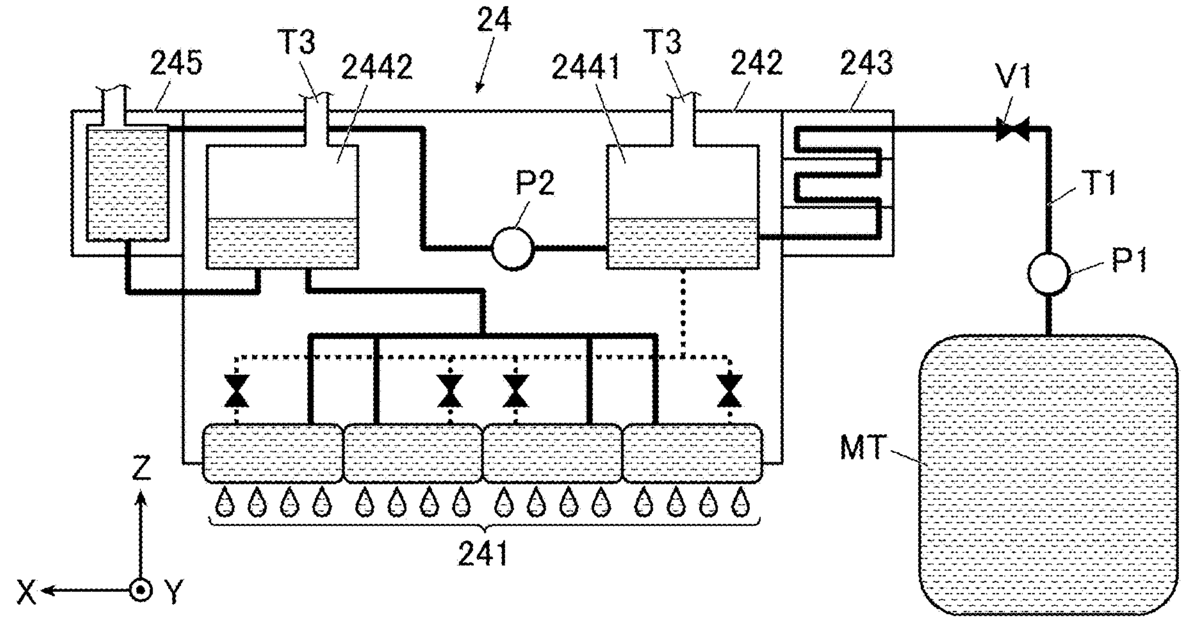
FIG. 6 is a schematic configuration diagram of the liquid sending portion of the inkjet recording apparatus according to a third embodiment.

The inkjet recording apparatus 1 according to a third embodiment will be described with reference to FIG. 6. Note that elements that are substantially the same as those described in the first embodiment are denoted by the same reference numerals, and detailed description of those elements is omitted.

The inkjet recording apparatus 1 according to the third embodiment is different from the first embodiment in that the first sub-tank 2441 communicates with the second sub-tank 2442 via a deaeration module 245 fixed to the second end that is the outer surface of the carriage 242.

{Deaeration Module}

Figure 7:
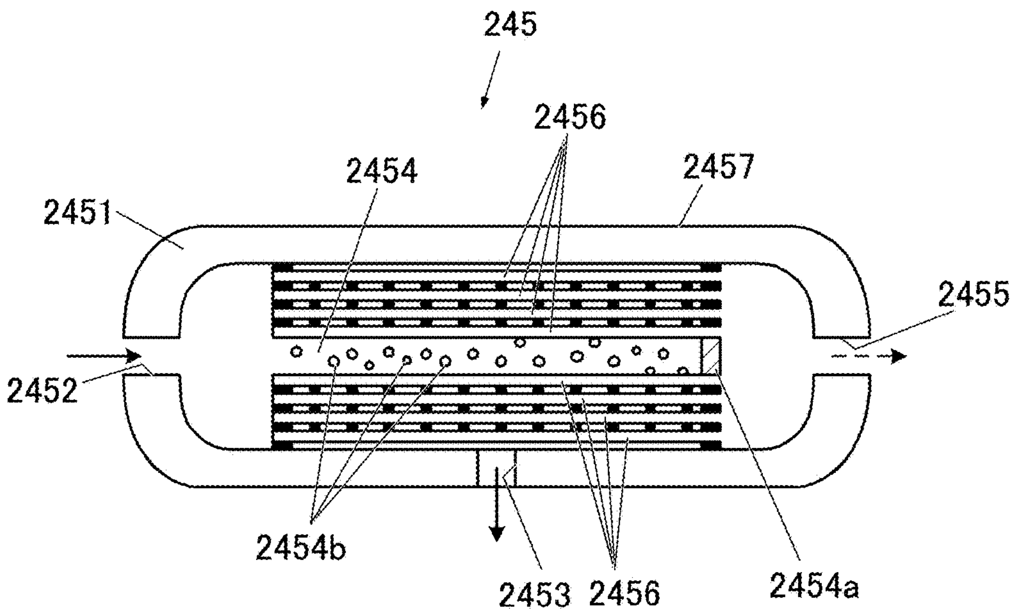
FIG. 7 is a schematic diagram of a deaeration module.

FIG. 7 is a schematic diagram of the cylindrical deaeration module 245 cut along a plane passing through the central axis thereof. The deaeration module 245 is shaped such that a large number of gas permeable films 2456 cover the periphery of a central pipe 2454 inside an outer shell 2451 made of, for example, aluminum. A first end of the central pipe 2454 is connected to an ink inlet 2452, and a second end opposite thereto is sealed with a plug 2454*a*. The central pipe 2454 has innumerable fine holes 2454*b* (perforation holes) in its outer wall. The ink having flowed into the central pipe 2454 from the ink inlet 2452 flows out to its periphery from the fine holes 2454*b*, passes through spaces between the gas permeable films 2456, and flows out from an ink outlet 2453. In this way, the deaeration module 245 is in the form of external reflux.

The gas permeable films 2456 are, for example, hollow fiber films, and their film surfaces have gas permeability. The hollow fiber films have a structure of a large number of hollow fine fibers with one end closed. The other end of the gas permeable films 2456 is connected to a gas outlet 2455, and the inside thereof is depressurized by air being sucked by a vacuum pump (not illustrated). In this state, when ink comes into contact with the outer film surface of a gas permeable film 2456, the ink comes into contact with a vacuum region with the gas permeable film 2456 in between, and only air in the ink selectively permeates the film surface and flows to the vacuum side, so that the ink is deaerated.

The deaeration module 245 is provided with a device heating section 2457 on its outer peripheral surface. The device heating section 2457 is, for example, a rubber heater, and heats the ink in the deaeration module 245 under the control of the controller 40.

In general, the higher the temperature of liquid is, the less the amount of dissolved gas is. Therefore, the controller 40 causes the device heating section 2457 to heat the ink in the deaeration module 245, thereby enhancing the deaeration efficiency of the deaeration module 245. In this way, the controller 40 functions as a second controller that controls the temperature of the deaeration module 245 by controlling the device heating section 2457. Specifically, the controller 40 preferably controls the device heating section 2457 such that the temperature thereof becomes around 90 °C, which is about 5 to 15 °C higher than the temperature of the ink when the ink is ejected from the inkjet heads 241, namely around 80 °C.

{Effects of Deaeration Module}

In the inkjet heads 241, ejection failure may occur if a foreign substance, such as air bubbles, is mixed in the liquid to be ejected. Providing the above-described deaeration module 245 in the head unit 24 makes it possible to remove the dissolved gas in the flowed ink before the ink is sent to the inkjet heads 241 and eject the deaerated ink.

Note that the deaeration module 245 according to the present embodiment can usually reduce the air concentration in the ink to a level that does not adversely affect the ejection of the ink, by one time of deaeration. However, as a circulatable channel, deaeration may be performed a plurality of times to further reduce the air concentration in the ink.

Effects of Third Embodiment

It is assumed that the capacity of the deaeration module 245 is 300 cc, and as described above, the controller 40 as the second controller controls the device heating section 2457 so as to heat the ink inside to 90 °C. At the time, the amount of heat of the deaeration module 245 is about 7,000 J, which is about the same as that of the ink heating device 243. Therefore, in the inkjet recording apparatus 1 according to the third embodiment, the ink heating device 243 fixed to the first end and the deaeration module 245 fixed to the second end of the outer surface of the carriage 242 function as the temperature equalizing mechanism. Then, since the temperatures of the carriage 242 at both ends become substantially uniform, the ink temperature control becomes easier.

In FIG. 5, the configuration in which the second sub-tank 2442 is provided substantially at the center of the carriage 242 as in the first embodiment, but the present invention is not limited thereto. In the second and third embodiments, as shown in FIG. 6, the first sub-tank 2441 and the second sub-tank 2442 are preferably provided closer to the first end and the second end of the carriage 242 to be apart from each other. With this structure, since the sub-tanks of the sub-tank 244 are both heated by the temperature equalizing mechanism, the ink temperature control becomes easier.

Fourth Embodiment

Figure 8:
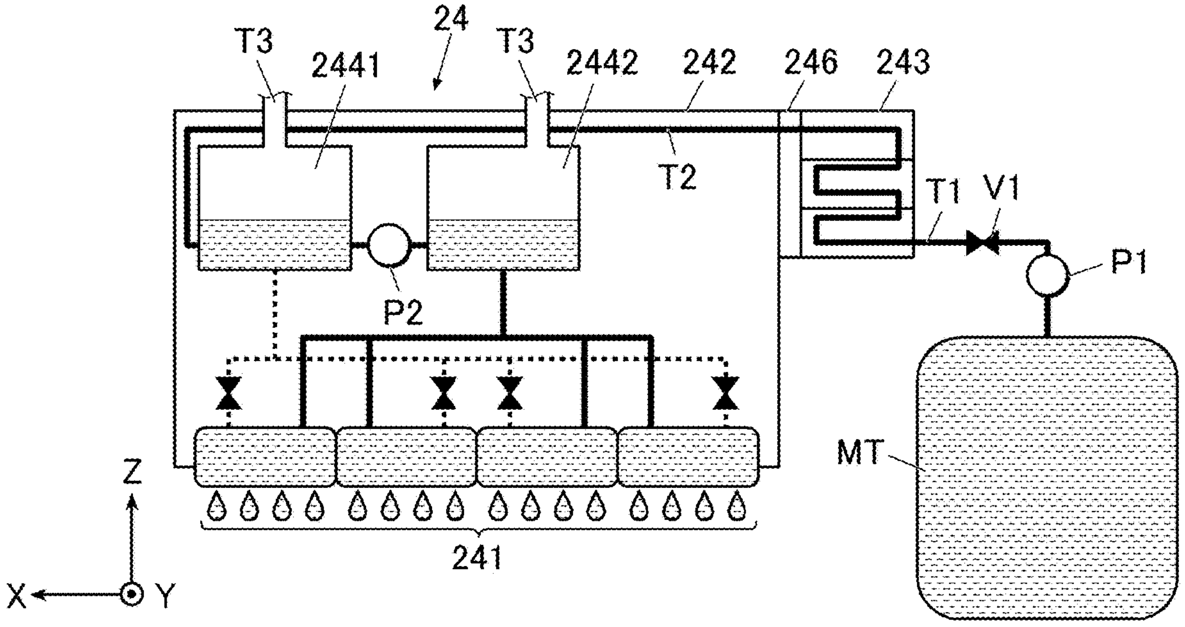
FIG. 8 is a schematic configuration diagram of the liquid sending portion of the inkjet recording apparatus according to a fourth embodiment.

Next, the inkjet recording apparatus 1 according to a fourth embodiment will be described with reference to FIG. 8. Note that elements that are substantially the same as those described in the first embodiment are denoted by the same reference numerals, and detailed description of those elements is omitted.

The inkjet recording apparatus 1 according to the fourth embodiment is different from the first embodiment in that a heat insulating member 246 which is the temperature equalizing mechanism is interposed between the carriage 242 and the ink heating device 243.

{Heat Insulating Member}

The heat insulating member 246 can be any as long as it has low heat conductivity and can be fixed to the carriage 242, and an appropriately known member can be used. The heat insulating member 246 is, for example, fluorine-based rigid resin or the like, but is not limited thereto.

Effects of Fourth Embodiment

As described above, in the inkjet recording apparatus 1 according to the fourth embodiment, the heat insulating member 246 which is the temperature equalizing mechanism is interposed between the carriage 242 and the ink heating device 243. According to the above-described configuration, the heat generated by the ink heating device 243 is blocked by the heat insulating member 246 and is not transmitted to the carriage 242. Therefore, the temperature distribution in the carriage 242 is suppressed, and decrease in image quality due to the temperature distribution of the ink can be suppressed.

Fifth Embodiment

Next, the inkjet recording apparatus 1 according to a fifth embodiment will be described. Note that elements that are substantially the same as those described in the first to fourth embodiments are denoted by the same reference numerals, and detailed description of those elements is omitted.

The inkjet recording apparatus 1 according to the fifth embodiment is different from the above embodiments in that each inkjet head 241 is provided with a heat retaining member and a thermometer (not shown). The controller 40 functions as a third controller that controls the temperature of each inkjet head 241 by changing the output of each heat retaining member based on the measurement data obtained from each thermometer. Specifically, the controller 40 controls the output of the heat retaining member of each inkjet head 241 such that the farther the inkjet head 241 is from the vicinity of the ink heating device 243, the higher the temperature thereof is.

Effects of Fifth Embodiment

As described above, the controller 40 of the inkjet recording apparatus 1 according to the fifth embodiment functions as the third controller that controls the temperature of the inkjet heads 241. The third controller performs control such that the farther the inkjet head 241 is from the ink heating device 243, the higher the temperature thereof is. According to the above-described configuration, the temperature of the ink to be ejected can be adjusted to be substantially the same between the inkjet head(s) 241 heated by the ink heating device 243 and the inkjet head(s) 241 heated by the heat retaining member. Therefore, it is possible to suppress image failure due to temperature unevenness of the ink.

Although specific description has been given above based on some embodiments according to the present invention, the present invention is not limited to the above embodiments. It is a matter of course that the present invention can be subjected to various modifications within the scope of the invention described in claims and equivalents thereof.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-179256, filed on Oct. 18, 2023, including description, claims, drawings and abstract is incorporated herein by reference.

What is claimed is:

1. An inkjet recording apparatus that forms an image by ejecting an ink to a recording medium from an inkjet head, comprising:
- an ink heating device that heats the ink;
- a carriage where a plurality of inkjet heads each being the inkjet head is mounted; and
- a temperature equalizing mechanism that substantially equalizes a temperature in the carriage,
- wherein the ink heating device is fixed to an outer surface of the carriage,
- wherein the ink heated by the ink heating device is supplied to the inkjet heads,
- wherein the temperature equalizing mechanism includes the ink heating device and a deaeration module that removes a dissolved gas in the ink,
- wherein the ink heating device is fixed to a first end of the carriage, and
- wherein the deaeration module is fixed to a second end opposite the first end of the outer surface of the carriage.

2. The inkjet recording apparatus according to claim 1, comprising:
- a main tank that stores the ink; and
- a sub-tank that stores the ink heated by the ink heating device to supply the ink to the inkjet heads,
- wherein the ink heating device heats the ink supplied from the main tank.

3. The inkjet recording apparatus according to claim 1, wherein the ink heating device is fixed to an end of the carriage.

4. The inkjet recording apparatus according to claim 1,
- wherein the temperature equalizing mechanism includes a first ink heating device and a second ink heating device each being the ink heating device,
- wherein the first ink heating device is fixed to a first end of the carriage, and
- wherein the second ink heating device is fixed to a second end opposite the first end of the outer surface of the carriage.

5. The inkjet recording apparatus according to claim 1, wherein the temperature equalizing mechanism includes a heat insulating interposed between the ink heating device and the carriage.

6. The inkjet recording apparatus according to claim 1, comprising a hardware processor that controls the ink heating device, wherein the hardware processor controls the ink heating device such that a temperature of the ink heating device is higher than a temperature of the ink ejected from the inkjet heads.

7. The inkjet recording apparatus according to claim 6, wherein the hardware processor controls the temperature of the ink heating device to be 5 °C to 15 °C higher than the temperature of the ink ejected from the inkjet heads.

8. The inkjet recording apparatus according to claim 1, comprising a hardware processor that controls a temperature of the deaeration module, wherein the hardware processor controls the deaeration module such that a temperature of the deaeration module is higher than a temperature of the ink ejected from the inkjet heads.

9. The inkjet recording apparatus according to claim 8, wherein the hardware processor controls the temperature of the deaeration module to be 5 °C to 15 °C higher than the temperature of the ink ejected from the inkjet heads.

10. The inkjet recording apparatus according to claim 6, wherein the temperature equalizing mechanism includes the hardware processor that controls a temperature of each of the inkjet heads, and wherein the hardware processor performs the control such that the farther each of the inkjet heads is from the ink heating device, the higher the temperature thereof is.

11. The inkjet recording apparatus according to claim 1, wherein as the ink, a phase transition ink that reversibly changes a phase between a solid state and a liquid state with a phase transition temperature as a boundary is used.

12. An ink heating unit comprising:

an ink heating device that heats an ink;

a carriage having an outer surface to which the ink heating device is fixed; and a temperature equalizing mechanism that substantially equalizes a temperature in the carriage, wherein the temperature equalizing mechanism includes the ink heating device and a deaeration module that removes a dissolved gas in the ink, wherein the ink heating device is fixed to a first end of the carriage, and wherein the deaeration module is fixed to a second end opposite the first end of the outer surface of the carriage.

* * * * *